United States Patent [19]
Patel

[11] 3,783,163
[45] Jan. 1, 1974

[54] AROMATIZING EDIBLE OILS
[75] Inventor: Jayantilal M. Patel, Cincinnati, Ohio
[73] Assignee: The Procter & Gamble Company, Cincinnati, Ohio
[22] Filed: Apr. 28, 1972
[21] Appl. No.: 248,558

[52] U.S. Cl................. 426/221, 426/386, 426/417
[51] Int. Cl. ............................................. A23f 1/04
[58] Field of Search...................... 99/65, 71, 140 A

[56] References Cited
UNITED STATES PATENTS
2,306,061  12/1942  Johnston................................ 99/71
3,406,074  10/1968  Klein et al. ............................ 99/71
2,947,634  8/1960   Feldman et al. ....................... 99/71
2,680,687  6/1954   Lemonnier.............................. 99/71
3,021,218  2/1962   Clinton et al. ......................... 99/71

Primary Examiner—Frank W. Lutter
Assistant Examiner—William L. Mentlik
Attorney—Richard C. Witte et al.

[57] ABSTRACT

Edible oils are aromatized by adding the oil to a cryogenic fluid to form a slurry, adding an aroma-bearing frost to the slurry, and allowing the mixture to equilibriate at temperatures above the boiling point of the cryogenic fluid for a period of time sufficient to evaporate the cryogenic fluid leaving a residue of aroma-enhanced oil.

11 Claims, No Drawings

AROMATIZING EDIBLE OILS

BACKGROUND OF THE INVENTION

An age-old problem in the instant coffee art has been, and still is, to prepare instant coffees having the same aroma as roast and ground coffee itself. Many methods have been utilized in attempting to approach this desired end result. For example, aroma materials have been steam stripped from roast and ground coffee and added back to instant coffee after complete processing; and coffee oil has been expelled from coffee beans and added back to final instant coffee product as an aroma-enhancing material. Other techniques which have commonly been employed include dry distillation of coffee beans to obtain aroma materials, utilization of complicated extraction processes in order to obtain coffee aroma materials, and the like. One method disclosed in the prior art is to obtain an aroma frost by low temperature condensation methods. Aroma frost is a low temperature condensate of volatiles which escape during coffee processing, for example, during roasting, grinding, steam distillation, extracting where it is employed, and dry distillation and the like. These volatile constituents are often obtained by low temperature condensation of escaping gaseous material, for example at liquid nitrogen temperatures, by passing the escaping gas through a liquid nitrogen trap to yield a condensate which is referred to herein as an aroma frost. The aroma frost may be grinder gas frost, roaster gas frost, a dry distillation frost, a stream distillation frost, and the like. For examples of patents relating to methods of providing aroma frost, see for example, Lemonnier, U.S. Pat. No. 2,680,687, issued June 8, 1954; U. S. Pat. No. 3,021,218, Clinton et al., issued Feb. 13, 1962; Kline, U. S. Pat. No. 3,406,074; Mook et al., U.S. Pat. No. 3,035,922, issued May 22, 1962; and Kline et al., U.S. Pat. No. 3,535,118, issued Oct. 20, 1970.

However, once obtained, to be of value aroma frost must then be incorporated in a relatively stable manner into the coffee product whose roast and ground coffee aroma is desired to be increased. Typically, this coffee product is an instant coffee because instant coffees are notably deficient in characteristic roast and ground coffee aroma. Additionally, the aroma frost itself must be incorporated into a stable carrier in order to have any significant amount of retained aroma value. The most common carrier is coffee oil. For further details relating to methods of incorporating aroma-enriched coffee oil into coffee products, see the copending application of Lubsen et al. entitled "Aroma-enriched Coffee Products and Process," filed Oct. 15, 1971, Ser. No. 189,746.

Of course, a first problem that must be confronted in aroma enriching coffee products is incorporation of aroma frost into a stable oil, such as coffee oil, in a manner which most efficiently imparts the highest possible amount of aroma to the coffee oil. The process of this invention relates to a technique of incorporating aroma frost into edible oils in such a manner that the amount of aroma-enriching components incorporated into the oil is at the highest possible level commensurate with practical processing techniques. While the primary utility of the process of this invention is in the field of incorporating coffee aroma frost into coffee oil, it should be understood that this technique has broader applicability and could, for example, be utilized in the preparation of aroma-enhanced products such as instant beverage drinks prepared from all common fruits and vegetables. Accordingly, while the majority of the description is presented herein with regard to the method of incorporating aroma into coffee oil, such a presentation is presented for convenience of description only and the invention is not to be limited thereby.

It is an object of this invention to provide a process of aromatizing edible oils with aroma frost in a manner which allows incorporation into the oil of a high level of aroma frost thereby producing an aroma-enriched oil capable of enhancing to a high degree the aroma of any desired product to which the aromatized oil is added.

The method of accomplishing this and other objects will become apparent from the following description of the invention.

SUMMARY OF THE INVENTION

This invention relates to a process of aromatizing edible oils which has been found to impart to the oil the desired aroma components of an aroma frost at a high intensity level. Therefore the resulting aroma-enriched oil can be utilized as an effective aroma-enhancing material when added back to products such as instant coffees. In one particular embodiment, the process comprises pouring the edible oil into a cryogenic fluid to form a slurry, adding aroma frost to the slurry, preferably mixing the slurry, and allowing the mixture to equilibrate at temperatures above the boiling point of the cryogenic fluid for a period of time sufficient to evaporate the cryogenic fluid leaving behind a residue of aroma-enriched oil.

DETAILED DESCRIPTION OF THE INVENTION

The edible oil which is to be utilized in the process of this invention can be obtained from a variety of sources. And, of course, the precise edible oil utilized depends upon the product whose aroma is to be enhanced. The edible oil which can be of either animal or vegetable origin, can include common triglyceride oils such as soybean oil, rapeseed oil, corn oil, marine oils, animal oils, and oils extracted from fruits, berries and vegetables. Of course, where the product whose aroma is to be enhanced is coffee, the most conveniently obtained and used oil is coffee oil.

Coffee oil is obtained by utilizing extraction methods well known in the art to obtain the oil from roast and ground coffee. Generally, two basic extraction methods are employed. The first comprises a liquid extraction process wherein extractives such as ether are utilized to remove coffee oil from roast and ground coffee. In this process the extractive after contact with the roast and ground coffee is removed to yield a residue of coffee oil. However, the far more common process comprises expressing coffee oil from roast and ground coffee beans by subjecting the beans to extreme pressure conditions. The product of this process is often referred to as "expressed coffee oil," and since expressed coffee oil has the advantage of not requiring the addition of foreign materials to obtain the coffee oil, expressed coffee oil is most often utilized in preparation of instant coffees.

According to the process of this invention the edible oil whose aroma is to be enhanced by incorporating therein an aroma frost is first poured into a cryogenic fluid to form an oil-cryogenic fluid slurry. As used herein, the term "cryogenic fluid" is used in its traditional sense as defined in the *Condensed Chemical Dic-*

*tionary*, 6th edition, at page 316, wherein cryogenics is referred to as a field of science dealing with the behavior of matter at very low temperatures and with low temperature techniques, for example, the use of liquefied gases such as oxygen, nitrogen, and hyrogen at temperatures as low as −260° C. As used herein the the terms "poured" and "added" are used interchangeably to define any manner of incorporating into the cryogenic fluid the edible oil and aroma frost.

When the edible oil, which is preferably at room temperature, is poured into a cryogenic fluid, because of the wide temperature differential several important things occur. Because of the extremely low temperature of the cryogenic fluid the edible oil virtually instantly freezes and fractures into very small particles, providing a frozen finely divided oil-cryogenic fluid slurry. While this rapid freezing and and simultaneous fracturing is occurring, the cryogenic fluid is simultaneously evaporating which results in a very highly porous structure within the divided frozen oil particles. The resulting finely divided frozen oil particles with a highly porous structure are especially suitable for incorporation of aroma because the fine state of particle subdivision allows for maximum contact between an aroma frost and the frozen oil, and the very porous nature of the divided particles allows for easy incorporation of aroma frost into the oil itself.

The ratio of oil to cryogenic fluid in this first step is not critical and optimization of that ratio for any particular oil can easily be accomplished. For coffee oil the ratio of coffee oil to cryogenic fluid should be within the range of from 1:10 to 1:1, preferably within the range of from 1:2 to 1:5. Experimental results have shown that at least for coffee oil it is preferred that the amount of cryogenic fluid be at least twice as great as the amount of coffee oil in order to insure that the above-described phenomenon of simultaneously freezing and fracturing to provide a highly porous subdivided frozen oil will occur. There is no criticality with regard to the maximum amount of cryogenic fluid utilized and the upper limits given herein are merely practical limits.

The cryogenic fluid utilized in this first step can be any of the conventionally known cryogenic fluids such as liquid nitrogen, liquid air, liquid oxygen, liquid hydrogen, liquid helium, and the like. However, the most easily obtained and perhaps one of the most inert cryogenic fluids is liquid nitrogen, and it is therefore preferred from the standpoint of availability as well as safety during use. Of course, other cryogenic fluids, as should be apparent to those skilled in the art, can also be employed with satisfactory performance results.

In the next step of the process of this invention, aroma frost is added to the frozen oil-cryogenic fluid slurry to provide an aroma frost-slurry mixture. No criticality exists with regard to the precise aroma frost employed and it can be obtained from those sources previously described. For example, if the aroma frost is to be a coffee aroma frost it can be an aroma frost collected and condensed at very low temperatures from various points in the processing of coffee to produce either instant coffee products or roast and ground coffee products. For example with regard to roast and ground coffee frost, grinder gas can be collected as a grinder gas frost, and where the coffee is a flaked coffee, gases escaping during compression to form flakes can be collected to form a flaking gas frost. With regard to instant coffee processing, frost can be obtained during dry distillation of roast and ground coffee beans, steam distillation of roast and ground coffee beans, and other similar processing steps. For details with regard to an important improvement in the manner of collecting aroma frost, see the copending application of Patel et al., Ser. No. 188,924, filed Oct. 13, 1971, entitled "Improved Aroma Condensation Process." For other methods of collecting aroma frost see the previously cited patents, in particular the Lemonnier, Mook, and Kline patents, as well as the copending application of Strobel, Ser. No. 158,590, filed June 30, 1971 now U.S. Pat. No. 3,717,472, entitled "Separating Aroma and Flavor Substrates Into Aroma-and-Flavor-Bearing Concentrates."

It is preferred, although not essential, that additional mixing occur after adding the aroma frost to the frozen subdivided porous oil-cryogenic fluid slurry. In this manner most intimate contact is insured. Preferably, where mixing or agitation is employed during the addition of aroma frost, the mixing is stopped and the combined mixture of aroma frost, frozen finely subdivided porous oil and cryogenic fluid slurry is allowed to stand under non-agitating conditions. When this occurs the solid material will settle to the bottom as a heterogeneous deposit, which of course allows further maximum contact on a solid particle-to-solid particle basis.

In the next step of the process the maximum is allowed to equilibrate at temperatures above the boiling point of the cryogenic fluid at least for a period of time sufficient to evaporate the cryogenic fluid and leave behind a residue of aroma-enhanced oil. No criticality is associated with the precise temperature employed here as long as the temperature is above the boiling point of cryogenic fluid. temperatures up to ambient conditions can be employed. However, for liquid nitrogen, temperatures within the range of from above the subliming point of $CO_2$ (−110° F) up to 0° F are preferred. During this step all undesired gases which are present are removed, such as for example carbon dioxide, carbon monoxide, and nitrogen. After the cryogenic fluid has completely evaporated, the coffee oil-aroma frost mixture has warmed sufficiently such that it is again liquid and is a significantly aroma-enhanced product suitable for addition to products whose aroma is desired to be increased, such as, for example, instant coffees.

While not essential in the broadest aspect of this invention but highly preferred, a further improvement in aroma enrichment has been noted where the aroma frost-edible oil mixture is allowed to equilibrate at temperatures not in excess of 0° F for at least a period of 8 hours, and for longer periods if desired. During this equilibration period more of the desirable aroma constituents are absorbed into the oil while additional undesirable constituents are apparently volatilized to gaseous form and lost. After completion of this aroma incorporation technique the aroma-enriched edible oil is then suitable for ultimate use in enhancing the aroma of consumer products such as, for example instant coffee, instant orange juice drinks, and other instant beverage drinks.

It should be understood that while the above description has been given in the context of first pouring edible oil into the cryogenic fluid and thereafter adding aroma frost to the cryogenic fluid-frozen oil slurry that this order of events has been presented merely for convenience of description, and should not be taken as limiting. If desired the aroma frost can be first added to the cryogenic fluid and the edible oil added thereafter or the edible oil and the frost can be added simultaneously.

The following Examples are intended to illustrate but not limit the process of this invention as described.

EXAMPLE 1

An orange aroma frost is obtained in the manner described in copending application of Patel et al., Ser. No. 74.074, filed Sept. 21, 1970, and now abandoned, entitled Cryogenic Aromatization of Instant Coffee. In particular, 2 pounds of sliced oranges were placed in a vessel which was in close communication with a finger trap held at −320° F by a bath of liquid nitrogen. The first portion of the vessel containing the sliced oranges was maintained at 70° F. Aroma materials escaping from the sliced fresh oranges traveled across the communicating line and condensed in the cold finger trap. Condensation continued until 0.5 grams of orange aroma frost was obtained.

0.5 grams of orange oil, which is an edible oil, was poured into liquid nitrogen, a cryogenic fluid, to form an oil cryogenic fluid slurry. The ratio of orange oil to cryogenic fluid was 1:40. When the orange oil was poured into the liquid nitrogen it virtually instantly froze and fractured into very small particles, providing a frozen finely divided oil cryogenic fluid slurry. Simultaneously with this phenomenon, cryogenic fluid was evaporating from the slurry which in turn caused a high degree of porosity in the frozen edible oil particles. 0.5 grams of aroma frost was added to the frozen finely divided edible oil liquid nitrogen slurry, mixed, and allowed to equilibrate at 0° F for 24 hours.

Thereafter a panel of experts compared the aroma body and intensity of aroma-enhanced orange oil with orange oil which had not been treated in accord with the process of this invention, and found the orange oil prepared in accord with the process of this invention to be more sweet, have more body, and a distinctly more fresh orange-like aroma.

EXAMPLE 2

Coffee aroma which normally escapes from roast and ground coffee during grinding, i.e., grinder gas, was swept away from grinders and condensed in a trap held at liquid nitrogen temperatures to produce a grinder gas frost. Aroma frost was collected until a 5-pound batch resulted.

5 pounds of coffee oil was poured into 12 pounds of liquid nitrogen at −320° F. Coffee oil which was poured into the liquid nitrogen was at room temperature. Virtually instantaneously upon pouring into the liquid nitrogen the coffee oil froze and fractured into finely divided particles. The frozen subdivided coffee oil particles upon close examination revealed a high degree of porosity, indicating that evaporating liquid nitrogen induced the formation of very porous particles ideally suited for aroma frost incorporation. The above referred to 5 pounds of grinder gas frost was placed in the coffee oil liquid nitrogen slurry and mixed for about 10 minutes. The mixture was allowed to stand for approximately 10 to 15 minutes until the majority of the liquid nitrogen had evaporated. Thereafter the remaining aroma frost frozen/coffee oil mixture was allowed to equilibrate at 0° F for about 24 hours. During this equilibration period the oil/aroma frost mixture warms up to 0° F and undesirable gases escape therefrom. It is also believed that aroma diffuses into the coffee oil during the equilibration period.

The oil is allowed to warm to room temperature slowly. Thereafter a panel smells the aroma-enriched oil and compares that smell to unaromatized oil and unanimously noted that the aroma-enhanced oil was significantly more coffee-like in aroma.

Equivalent results are obtained in this example when the grinder gas aroma frost is added to the liquid nitrogen first and the edible oil is added thereafter, and when the edible oil and the aroma frost are added to the liquid nitrogen simultaneously.

What is claimed is:

1. A process of aromatizing edible oils, comprising adding said oil to a cryogenic fluid to form an oil-cryogenic fluid slurry, adding aroma frost to said slurry to provide an aroma frost-slurry mixture, allowing said mixture to equilibrate at temperatures above the boiling point of the cryogenic fluid for a period of time sufficient to evaporate the cryogenic fluid leaving a residue of aroma-enhanced oil.

2. The process of claim 1 wherein the edible oil is a triglyceride oil.

3. The process of claim 1 wherein the edible oil is coffee oil.

4. The process of claim 1 wherein the aroma frost is a coffee aroma frost.

5. The process of claim 4 wherein the aroma frost is selected from the group consisting of roaster gas frost, grinder gas frost, dry distillation frost, a steam distillation frost, and a flaking gas frost.

6. The process of claim 5 wherein the cryogenic fluid is liquid nitrogen.

7. The process of claim 6 wherein the ratio of coffee oil to liquid nitrogen is from 1:10 to 1:1.

8. The process of claim 7 wherein the equilibration temperature is within the range of from just above the subliming point of carbon dioxide up to 0°F.

9. The process of claim 8 wherein the equilibration time is at least 8 hours.

10. The product of the process of claim 1.

11. A process of aromatizing edible oils comprising adding aroma frost to a cryogenic fluid, adding an edible oil to said cryogenic fluid and allowing said mixture to equilibrate at temperatures above the boiling point of the cryogenic fluid for a period of time sufficient to evaporate the cryogenic fluid leaving a residue of aroma-enhanced oil.

* * * * *

PO-1050
(5/69)

UNITED STATES PATENT OFFICE
CERTIFICATE OF CORRECTION

Patent No. 3,733,163  Dated January 1, 1974

Inventor(s) Jayantilal M. Patel

It is certified that error appears in the above-identified patent and that said Letters Patent are hereby corrected as shown below:

Column 1, line 29    "stream" should be -- steam --.

Column 3, line 5     "hyrogen" should be -- hydrogen --.

Column 4, line 28    "maximum" should be -- mixture --.

Column 4, line 35    "temperatures" should be capitalized.

Signed and sealed this 4th day of June 1974.

(SEAL)
Attest:

EDWARD M. FLETCHER, JR.          C. MARSHALL DANN
Attesting Officer                Commissioner of Patents